US008643913B2

(12) United States Patent
Tagaki et al.

(10) Patent No.: US 8,643,913 B2
(45) Date of Patent: Feb. 4, 2014

(54) IMAGE FORMING APPARATUS FOR STORING READ IMAGE DATA IN DIFFERENT STORAGE DEVICES

(75) Inventors: Koji Tagaki, Osaka (JP); Youhei Yamada, Osaka (JP)

(73) Assignee: Kyocera Document Solutions Inc., Osaka (JP)

( * ) Notice: Subject to any disclaimer, the term of this patent is extended or adjusted under 35 U.S.C. 154(b) by 201 days.

(21) Appl. No.: 13/241,341

(22) Filed: Sep. 23, 2011

(65) Prior Publication Data

US 2012/0081724 A1 Apr. 5, 2012

(30) Foreign Application Priority Data

Sep. 30, 2010 (JP) .................................. 2010-221784

(51) Int. Cl.
*H04N 1/04* (2006.01)
(52) U.S. Cl.
USPC ............................. 358/474; 358/1.9; 358/1.15
(58) Field of Classification Search
None
See application file for complete search history.

(56) References Cited

U.S. PATENT DOCUMENTS

| 5,539,865 | A * | 7/1996 | Gentile ........................ 358/1.16 |
| 5,570,432 | A * | 10/1996 | Kojima ........................ 382/254 |
| 6,182,090 | B1 * | 1/2001 | Peairs ........................... 715/209 |
| 6,681,372 | B2 * | 1/2004 | Yajima ........................ 715/268 |
| 2003/0184828 | A1 | 10/2003 | Morisaki |
| 2007/0013562 | A1 * | 1/2007 | Nagasawa ........................ 341/50 |
| 2008/0018920 | A1 * | 1/2008 | Kawamoto et al. ............. 358/1.9 |
| 2009/0323134 | A1 * | 12/2009 | Megawa ......................... 358/474 |

FOREIGN PATENT DOCUMENTS

| JP | 2003-298798 A | 10/2003 |
| JP | 2001-223858 A | 8/2007 |
| JP | 2010-110956 A | 5/2010 |

OTHER PUBLICATIONS

English Machine Translation of JP 2003-298798.
English Machine Translation of JP 2010-110956.
Notice of Reasons for Rejection issued to JP Application No. 2010-221784 mailed Jan. 9, 2013.

* cited by examiner

*Primary Examiner* — Dung Tran (57) ABSTRACT

An image forming apparatus includes: an internal storage device; an attachment portion to which an external storage device can be attached; an image reading unit that reads contents of an original as an image and converts the image into an electronic signal; a first image processing unit that generates image data from the electronic signal; and a second image processing unit that separates the image data thus generated into character data that is recognized as characters and data that is recognized as different data from the character data and, when the external storage device is attached to the attachment portion, stores data composed of an entirety or a part of the character data that is recognized as characters as first data in the external storage device and the data that is recognized as different data from the character data as second data in the internal storage device.

5 Claims, 5 Drawing Sheets

IMAGE FORMING APPARATUS FOR STORING READ IMAGE DATA IN DIFFERENT STORAGE DEVICES

This application is based on and claims the benefit of priority from Japanese Patent Application No. 2010-221784, filed on 30 Sep. 2010, the content of which is incorporated herein by reference.

BACKGROUND OF THE INVENTION

1. Field of the Invention

The present invention relates to an image forming apparatus provided with an image reading unit.

2. Related Art

Currently, an image reading device such as an image scanner is not only used alone but also widely used in a state of being embedded in a copy machine, a facsimile machine, a printer, an image forming apparatus called a digital multifunction peripheral having functions thereof, and the like. In a case in which the image reading device is used alone, for example, the image reading device is connected to a PC (personal computer) via a cable. An image that is read is submitted from the image reading device to the PC in a form of data, and thereafter the PC reproduces the image.

As such an image reading device, an image reading device has been known that is a substantially a read only device for reading a relatively small-sized card type original including a business card and a postcard, and that reads for example a graphical image such as a corporate logo, characters and numbers such as address, name, telephone number, fax number and the like printed on a business card and submits to a PC in a form of image data.

In general, image data captured by the image reading device is extremely high in data volume compared to other types of data. Therefore, in a case of successively reading a plurality (a large number) of business cards or cards and successively submitting image data to a PC in real time, a conventional method takes a long time and is inefficient. The above-mentioned image reading device is improved to increase efficiency by employing the following method.

The image reading device of the related art 1 first reads image data on an original surface by scanning and identifies and separates each part of the image data as character data and graphical data. More specifically, the image reading device recognizes an image being read as character data if tones of the image are represented by two-valued data or black-and-white data, and as graphical data if tones of the image are represented by multivalued data with at least 3 tones, or by color data. Thereafter, the image reading device transfers the character data thus identified in a bulk transfer mode and the graphical data thus identified in an isochronous transfer mode to a PC.

In the abovementioned method, the bulk transfer mode, in which the PC can request retransmission in a case of transmission error although immediacy of transfer cannot be expected, is suitable for character data transfer that requires confirmation of content while not requiring a high data transfer rate. On the other hand, the isochronous transfer mode guarantees data transfer rate while not handling data transfer error, thereby efficiently transferring the graphical data with high data volume. Transfer time between the image reading device and the PC is thus reduced.

Here, not limited to the abovementioned image reading device, a copy machine, a facsimile machine, a printer, and a multifunction peripheral having a function of storing image data of an image store a complete set of the image data to a storage medium provided in an apparatus main body or to an external storage medium such as a PC. From a point of view of security, this means that contents of the original thus stored can be stolen from the apparatus main body or the external storage medium, and that, in some cases, confidential information included in the original may leak to the outside and the original may be copied by a third party.

SUMMARY OF THE INVENTION

The present invention aims at providing an image forming apparatus that can prevent leakage of contents of image data read from an original.

The present invention relates to an image forming apparatus that reads a content of an original as an image and prints the content of the original thus read onto a transfer medium as an image, including: an internal storage device; an attachment portion to which an external storage device can be attached; an image reading unit that reads contents of an original as an image and converts the image into an electronic signal; a first image processing unit that generates image data from the electronic signal; and a second image processing unit that separates the image data thus generated into character data that is recognized as characters and data that is recognized as different data from the character data and when the external storage device is attached to the attachment portion, stores data composed of an entirety or a part of the character data that is recognized as characters as first data in the external storage device and the data that is recognized as different data from the character data as second data in the internal storage device.

In the image forming apparatus of the present invention, even if a third party has successfully captured the image data stored in the internal storage device, the data contains the graphical data, the color data and the like, meaningful information composed of character strings is stored in the external storage device. Therefore, it is difficult to read the content of the original only from the data thus captured. This can prevent leakage of substantially meaningful contents of the original from the image forming apparatus to the outside and complete copying of the original.

DETAILED DESCRIPTION OF THE INVENTION

Figure 1:
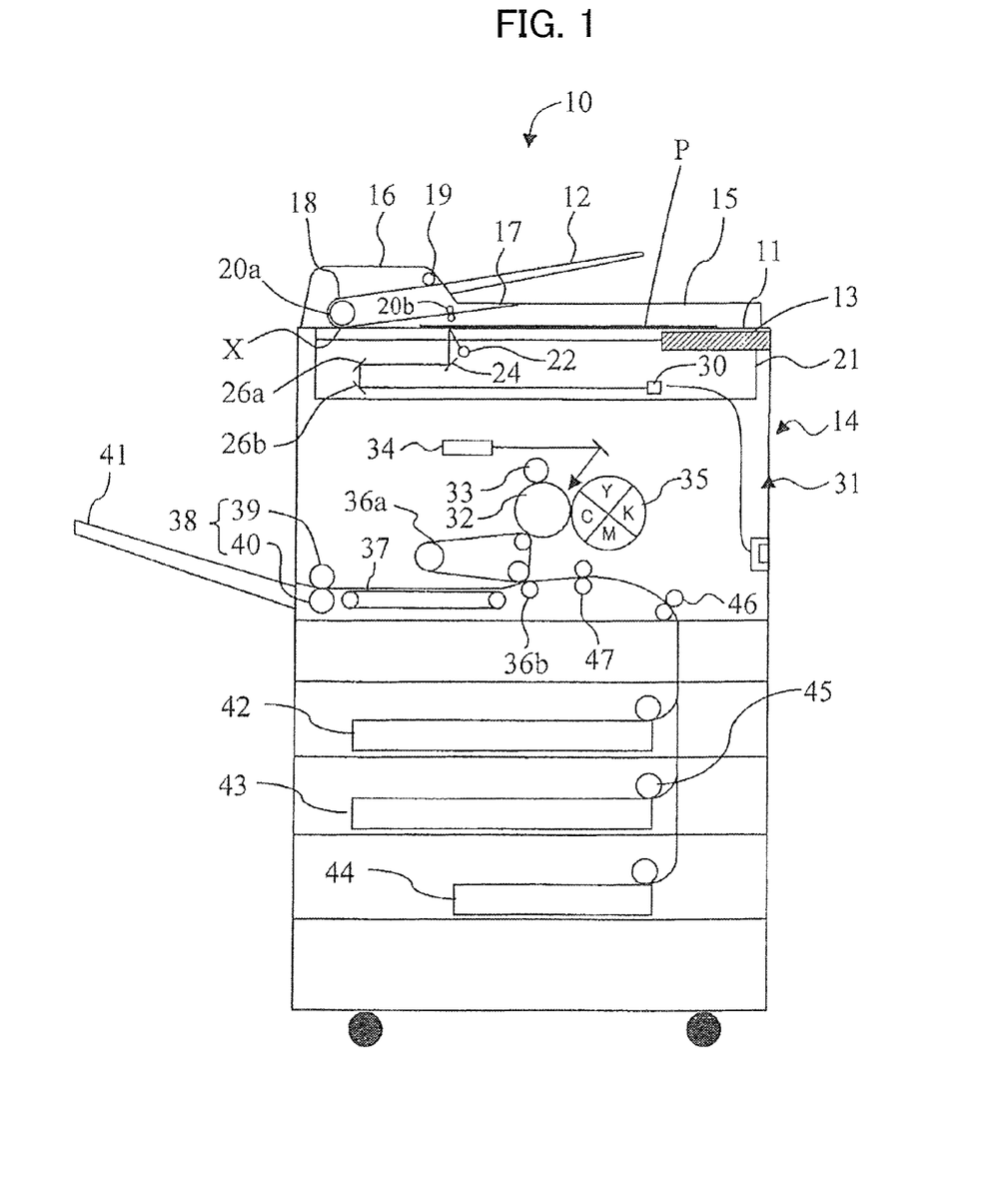
FIG. 1 is a schematic view illustrating an internal entire configuration of a multifunction peripheral according to an embodiment of the present invention.

An embodiment of the image forming apparatus according to the present invention is described hereinafter with reference to the drawings. It should be noted that the present embodiment is a mere example of implementation of the present invention, and in no way restricts the technical scope of the present invention. FIG. 1 is a schematic view illustrating an entire internal configuration of the image forming apparatus according to the present embodiment. In FIG. 1, details of each component not directly related to the present embodiment are omitted. An image forming apparatus may have a variety of functions. The apparatus shown in FIG. 1 is a digital multifunction peripheral having functions of print, copy, scan, facsimile and the like.

As the digital multifunction peripheral is often used as a copy machine, configuration and operation of the multifunction peripheral as a copy machine are mainly described hereinafter.

When printing an original P using the multifunction peripheral 10, for example, a user places the original P on a light transmissive platen 11 or a document tray 12 shown in FIG. 1, and inputs conditions for copying and makes an instruction for printing through an input/display unit 13 disposed near the platen 11. The input/display unit 13 is disposed horizontally in front of the platen 11 when viewed from a user operating the multifunction peripheral 10.

The input/display unit 13 is used by a user for inputting setting conditions relating to image reading and image formation and instructions for processing, and for confirming the setting conditions and instructions thus input and messages displayed in response thereto. The input/display unit 13 is provided with a touch screen (operation panel) and operation keys (for example, numerical keys, a start key, a clear key, a stop key, a reset key, a power key and the like) for facilitating input of the setting conditions and instructions as described above, and display of messages after user's input.

In response to the instruction for printing from the input/display unit 13, components (mechanically driven components) start operating. Image formation (printing) is thus performed.

As shown in FIG. 1, the multifunction peripheral 10 is provided with a platen cover 15 disposed above the main body 14. The platen 11 is disposed on an upper surface of the main body 14. The platen 11 is configured to be opened and closed with the platen cover 15. The platen cover 15 is provided with an automatic document feeder 16, the document tray 12, and a paper ejection tray 17.

The automatic document feeder 16 is configured by including an original conveyance path 18 formed within the platen cover 15, a pickup roller 19 and conveyance rollers 20a and 20b provided within the platen cover 15, and the like. The original conveyance path 18 is a carrier path for an original that communicates from the document tray 12 to the paper ejection tray 17 via a reading position X at which the original is read by an image reading unit 21 provided in the main body 14.

When a plurality of originals is placed on the document tray 12, the automatic document feeder 16 feeds the originals one by one into the document conveyance path 18 by means of the pickup roller 19, lets the originals thus fed pass through the reading position X, and ejects the original to the paper ejection tray 17 by means of the conveyance roller 20b. While passing through the reading position X, the original is read by the image reading unit 21.

Figure 2:
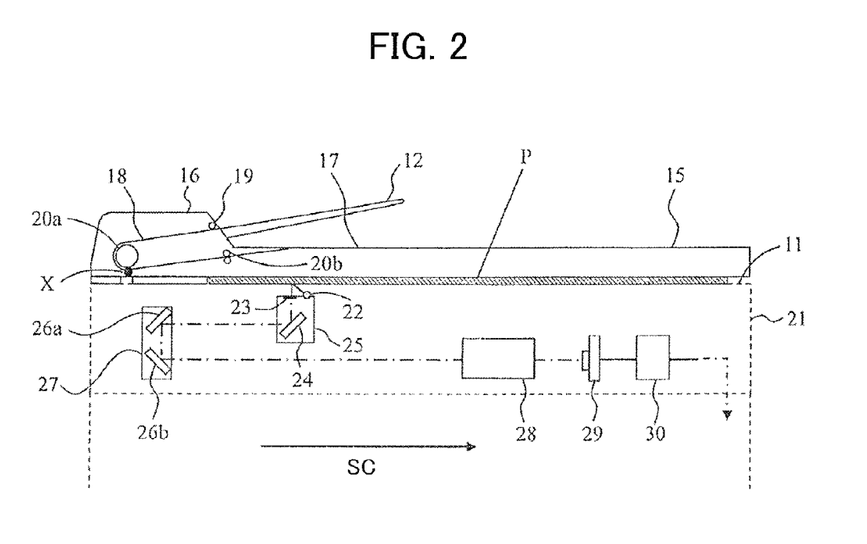
FIG. 2 is an enlarged view illustrating an image reading unit of the multifunction peripheral shown in FIG. 1.

The image reading unit 21 is disposed below the platen 11. Detailed configuration of the image reading unit 21 is illustrated in FIG. 2. With reference to FIGS. 1 and 2, the image reading unit 21 is provided with: a first movable carriage 25 including a light source 22 elongated in a so-called main scanning direction that irradiates the platen 11 from below, a slit 23 that selectively transmits light from the platen 11, and a mirror 24 that guides the light from the platen 11; a second movable carriage 27 including mirrors 26a and 26b that re-reflect reflected light from the first movable carriage 115; a lens group 28 that optically corrects the light guided by various mirrors; an imaging device 29 that receives the light corrected by the lens group 118; and an image data generating unit 30 that converts the light received by the imaging device 29 into electrical signals and, as necessary, performs correction processing of the electrical signals, image quality processing, compression processing, and the like.

The image reading unit 21 thus configured performs two types of operation.

In a case of reading the original on the automatic document feeder 16, the light source 22 moves to a position at which the reading position X can be irradiated, and emits light. The light from the light source 22 is transmitted through the platen 11 and reflected by a surface of the original that is conveyed through the reading position X by the conveyance rollers 20a and 20b, and is guided toward the imaging device 29 by means of the slit 23, the mirrors 24, 26a, and 26b, and the lens group 28. The imaging device 29 converts the received light into electrical signals, and transmits the electrical signals to the image data generating unit 30. The light received by the imaging device 29 is inputted to the image data generating unit 30 as analog electrical signals of R (red), G (green), and B (blue). The image data generating unit 30 performs analog-digital conversion (AD conversion), i.e. digitalization. Furthermore, the image data generating unit 30 takes the sequentially converted digital signal as a piece of unit data, and performs correction processing, image quality processing, compression processing and the like on the piece of unit data, thereby generating image data configured by a plurality of pieces of unit data.

Moreover, the image reading unit 21 can also read an original placed on the platen 11, in addition to the document conveyed by the automatic document feeder 16. In a case of reading the original placed on the platen 11, the first movable carriage 25 moves in a so-called sub-scanning direction SC (see FIG. 2) while causing the light source 22 to emit light, and the second movable carriage 27 moves in a direction toward the imaging device 29 at half of the speed of the first movable carriage 25 so as to keep a length of a light path constant between the light source 22 and the imaging device 29.

Similarly to the case of placing the original on the automatic document feeder 16, the imaging device 29 converts reflected light from the original P placed on the platen 11 into electrical signals based on the light guided by the mirrors 24, 26a, and 26b, and the image data generating unit 30 generates image data (document data) based thereon the converted signals.

The image forming unit 31 is provided below the image reading unit 21 of the main body 14 of the multifunction peripheral, and prints (outputs) the image data. Image data printable by the image forming unit 31 includes: image data generated by the image data generating unit 30 as described above; and image data received from a user terminal such as a personal computer (PC) connected to the multifunction peripheral 10 in a network such as a LAN, via a network interface provided in the multifunction peripheral 10.

The printing method employed by the image forming unit 31 is the xerographic method. The xerographic method is a method of: forming a latent image on the photoreceptor drum 32 by charging the photoreceptor drum 32 evenly by a charging device 33 and then irradiating the photoreceptor drum 32 by a laser irradiator 34; forming a visible image by attaching a toner by a developing device 35; and transferring the visible image to a transfer medium using a transfer roller.

In a case of a multifunction peripheral supporting full color image, the abovementioned developing device (rotary developer) 35 rotates in a circumferential direction about a rotational axis that is perpendicular to the paper surface in FIG. 1, and a developing unit containing a toner of a corresponding color is positioned at a position opposing the photoreceptor drum 32. In this state, the latent image on the photoreceptor drum 32 is developed by the toner stored in the developing unit 35, and is transferred to an intermediate transfer belt 36a. It should be noted that the developing device 35 includes four developing units (Y), (C), (M) and (K) respectively storing toners of yellow (Y), cyan (C), magenta (M), and black (K). By performing the transfer to the intermediate transfer belt 36a for each color, a full color image is formed on the intermediate transfer belt 36a.

A sheet-shaped transfer medium, i.e. printing paper, onto which the full color image thus formed is printed, is placed in paper feeding cassettes 42, 43 and 44.

Upon printing, the image forming unit 31 picks up a sheet of the transfer medium from one of the paper feeding cassettes using a pickup roller 45, and feeds the transfer medium thus picked up into between the intermediate transfer belt 36a and a transfer roller 36b by means of a conveyance roller 46 and a resist roller 47.

The image forming unit 31 transfers the visible image on the intermediate transfer belt 36a onto the transfer medium that has been fed into between the intermediate transfer belt 36a and the transfer roller 36b, and conveys the transfer medium by a conveyance belt 37 to a fusing unit 38 (fusing device) for fusing the visible image. The fusing unit 38 is provided with a heating roller 39 with a built-in heater, and a pressurizing roller 40 that is pressed against the heating roller 39 at a predetermined pressure. When the transfer medium passes between the heating roller 39 and the pressurizing roller 40, the visible image is fused onto the transfer medium by heat and a pressing force applied thereon. The transfer medium onto which the image is fused is ejected to the paper ejection tray 41. By the above-described steps, the multifunction peripheral 10 provides a copying function to a user.

Figure 3:
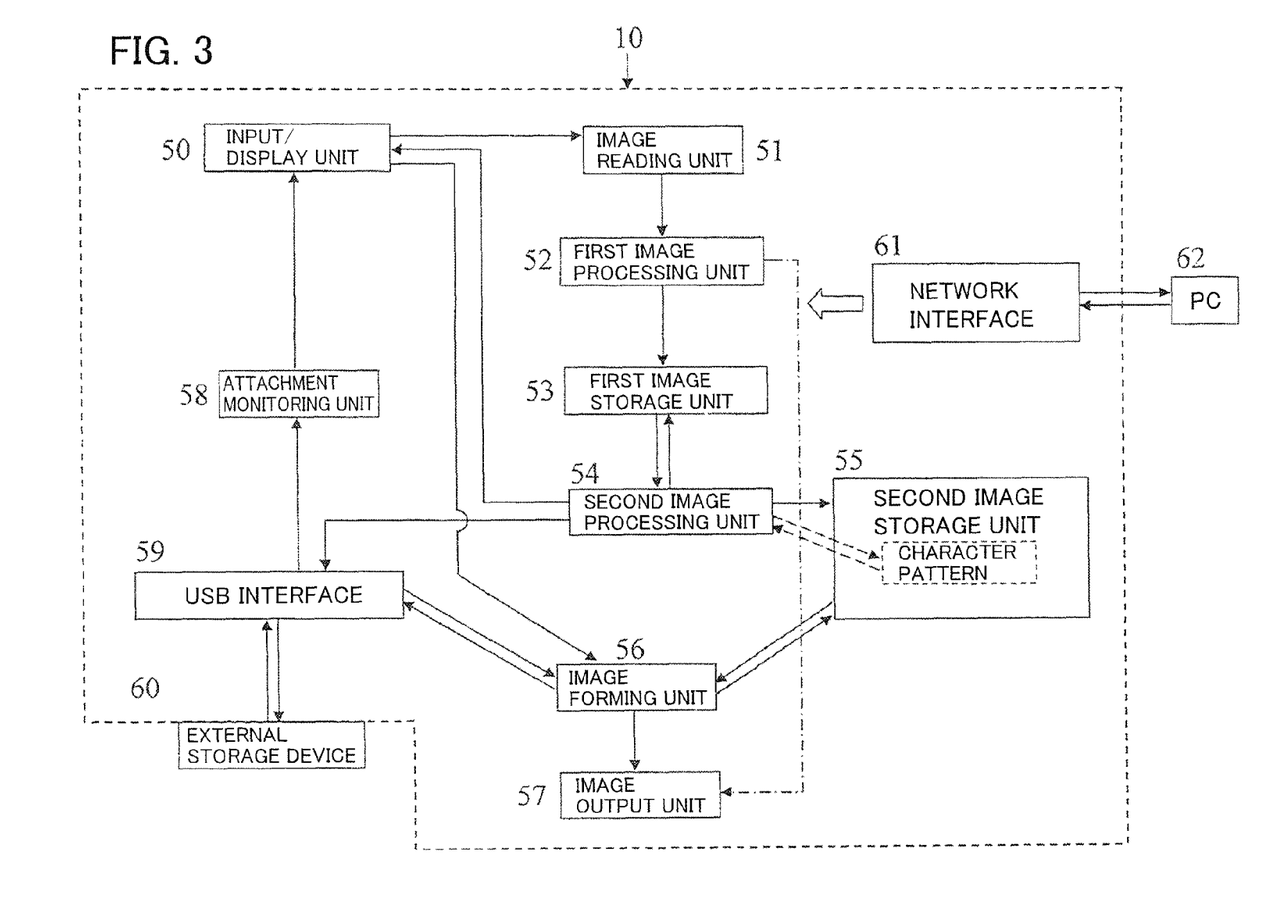
FIG. 3 is a functional block diagram illustrating constitution of the multifunction peripheral shown in FIG. 1.

FIG. 3 is a functional block diagram showing a functional configuration of the image forming apparatus according to the present embodiment. This configuration corresponds to the multifunction peripheral 10 shown in FIGS. 1 and 2. Each of functional blocks is briefly described hereinafter. An input/display unit 50 corresponds to the input/display unit 13 (in FIG. 1) and is used by a user for: inputting setting conditions relating to image reading and image formation and instructions for processing; and displaying the setting conditions and instructions thus input or a message in response thereto.

An image reading unit 51, approximately corresponding to the image reading unit 21 in FIG. 1 or 2, includes an optical system and a driving system such as: the light source 22; the slit 23; the first movable carriage 25; the second movable carriage 27; the lens group 28 and the imaging device 29.

A first image processing unit 52, corresponding to the image data generating unit 30 in FIG. 2, performs: AD conversion of an image signal received as an electronic signal; correction processing, image quality processing, compression processing and the like of a digital signal thus obtained; and generation of image data. A first image storage unit 53, which is specifically composed of RAM (Random Access Memory) in the present embodiment, temporarily stores information such as image data.

A second image processing unit 54 mainly performs processing of separating the image data generated by the first image processing unit 52 into: graphical data and color data; and character data, included in a corresponding original. A second image storage unit 55 is a nonvolatile storage device (internal storage device) included in the multifunction peripheral 10, and specifically is a HDD or high-capacity flash memory. The second image storage unit 55 mainly stores a plurality of pieces of image data previously obtained by the multifunction peripheral 10 and information relating to individual image data files, as well as a program for drive control of the multifunction peripheral 10 and an image processing program for the first image processing unit 52 and the second image processing unit 54.

The image forming unit 56 reproduces a content (image) of the original by combining the graphical data and the character data included in a single original that have been separated by the second image processing unit 54.

An image output unit 57, appropriately corresponding to an internal configuration of the image forming unit 31 in FIG. 1, is composed of: the photoreceptor drum 32; the charging device 33; the laser irradiator 34; the developing device 35; the intermediate transfer belt 36a; the transfer roller 36b; the fusing unit 38; and the like, for printing an image of an original.

The multifunction peripheral 10 according to the present embodiment includes a USB interface 59. The multifunction peripheral 10 is configured such that an external storage device 60 (such as a USB flash drive), which is independent from a main body of the multifunction peripheral 10, can be connected thereto via the USB interface 59. The multifunction peripheral 10 can store image data generated from the original to the external storage device 60.

A USB port to which the external storage device 60 is connected (an attachment portion for the external storage device 60) is provided on, for example, a side face of the input/display unit 13 (FIG. 1).

An attachment monitoring unit 58 monitors continuously whether the external storage device 60 is attached to the main body of the multifunction peripheral 10, and transmits a detection signal upon detection of attachment of the external storage device 60.

In addition, the multifunction peripheral 10 is provided with a network interface 61 that allows use of the multifunction peripheral from a user terminal such as a PC 62 that is connected to a network such as a LAN.

In the multifunction peripheral 10 thus configured, in a case of general copying of an original, for example, a user inputs copying conditions through the input/display unit 50 and presses the start key on the input/display unit 50. The image reading unit 51 then reads an image of the original and converts the image into electronic signals. The first image processing unit 52 generates image data by processing the electronic signals. Thereafter, the image output unit 57 prints the image of the original based on the image data, following a path shown by a dashed-dotted line in FIG. 3.

Figure 4:
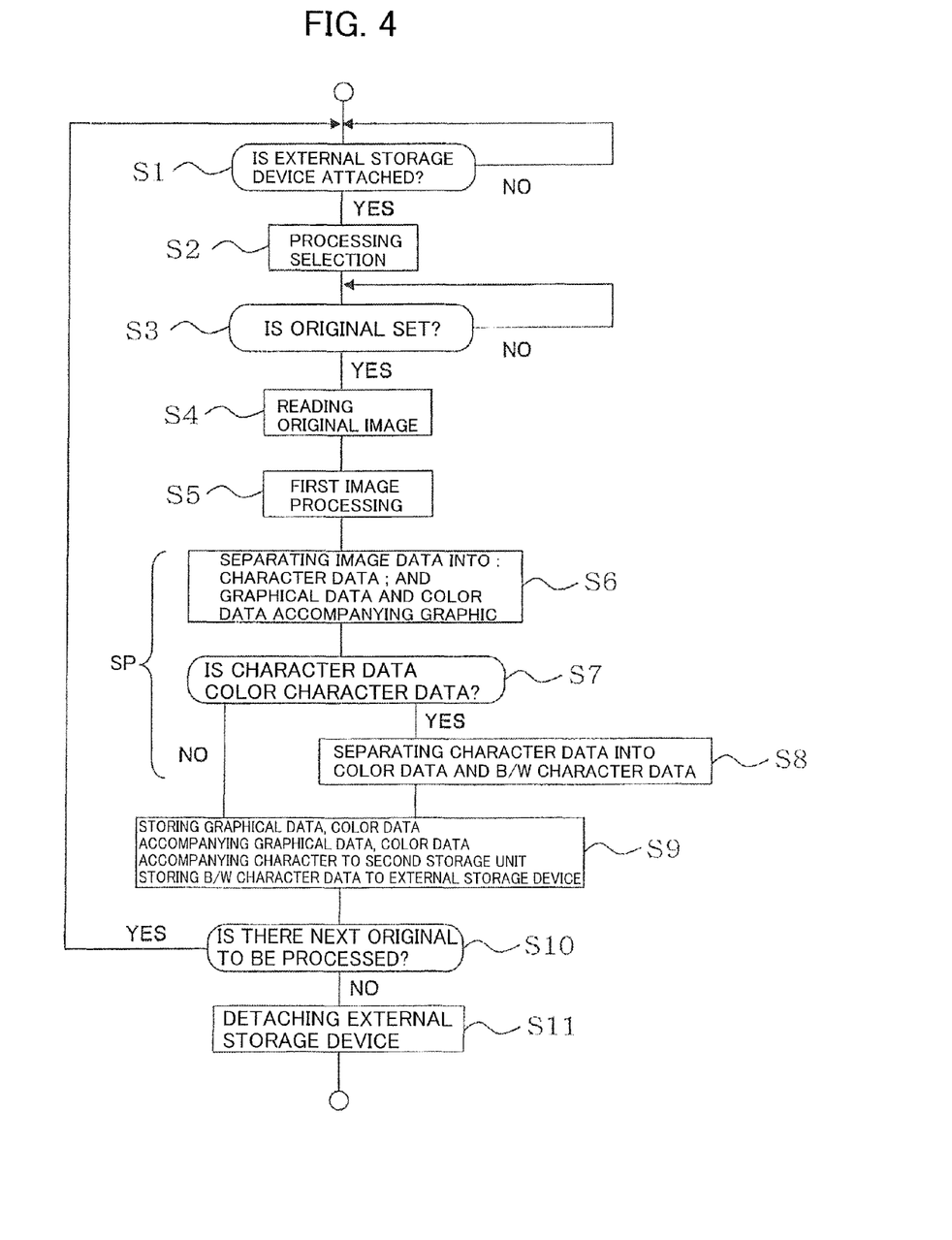
FIG. 4 is a flow chart explaining an image data storing method according to an embodiment of the present invention.

Storage of the image data and reproduction of the image of the original using the image forming apparatus according to the present embodiment shown in FIG. 3 are described hereinafter with reference to FIGS. 3 and 4. FIG. 4 is a flow chart showing a procedure according to the present embodiment from reading image of the original to storage of image data, using the image forming apparatus of FIG. 3 as a scanner. Hereinafter, the flow chart is described on the assumption that the original to be read by the image forming apparatus is a full-color original that includes a graphic such as a photograph and characters.

First, the attachment monitoring unit 58 of the image forming apparatus (multifunction peripheral 10) monitors continuously whether the external storage device 60 such as a USB flash drive is attached. If the external storage device 60 is not attached, the image forming apparatus maintains a stand-by state (Step 1: S1 NO). When a user attaches the external storage device 60 to the main body of the image forming apparatus, the attachment monitoring unit 58 detects attachment and transmits a detection signal to the input/display unit 50 (Step 1: S1 YES).

Next, the input/display unit 50 performs display for prompting the user to instruct a process to be performed in response to the attachment of the external storage device 60. For example, the input/display unit 50, on a touch screen thereof, displays a message "Please Select Process", while displaying in parallel push buttons corresponding to a plurality of processes that can be performed using the external storage device 60 thus attached. These push buttons have processes registered thereto, respectively: 1. reading an image of an original and storing image data thereof separately to the external storage device 60 and the second image storage unit 55; 2. reproducing the image of the original by combining data relating to a specific original stored separately in the external storage device 60 and the second image storage unit 55; 3. reading an image of an original and stores entire image data thereof to the external storage device 60; and 4. printing an image of an original based on image data stored in the external storage device 60, for example.

When a user selects and presses the push button of "1. reading an image of an original and storing image data thereof separately to the external storage device 60 and the second image storage unit 55" among the four push buttons displayed on the touch screen of the input/display unit 50 (Step 2: S2), the input/display unit 50 obtains original placement information from an original sensor (not illustrated in FIGS. 1 to 3) provided in the vicinity of the automatic document feeder 16 or the platen 11.

In a case in which no original is placed (Step 3: S3 NO), the input/display unit 50 performs display for prompting placement of an original and stands by while monitoring placement of an original. After receiving notification of the placement of an original from the original sensor (Step 3: S3 YES), the input/display unit 50 displays a message showing that reading of original image can be performed.

When a user presses a button for starting reading the original image, which is displayed for example on the touch screen of the input/display unit 50, according to the message, the image reading unit 51 starts operating. The image reading unit 51 reads an image on a surface of the original being placed at scanning density of 400 to 600 dpi, for example (Step 4: S4).

The first image processing unit 52 generates image data by performing first image processing, such as correction processing, image quality processing, compression processing and the like, to image signals obtained by the image reading unit 51, and temporarily stores the image data thus generated to the first image storage unit 53 (Step 5: S5).

Thereafter, the image data is transferred from the first image storage unit 53 to the second image processing unit 54, where second image processing SP is performed.

In the second image processing, first, character string having been read as the image data is recognized and the image data is separated into character data obtained by character recognition and data different from the character data. The second image processing unit 54 performs division processing for separating the image data into: character data; and graphical data and color data accompanying graphic (Step 6: S6).

As a character recognition method for image data, the following method can be employed, for example. In a case in which an original corresponding to the image data contains character strings, drawings, and photographs, first, location of character regions in which the character strings are arranged is determined and a reading order of the character regions is determined. Next, a specific line of character strings included in the character regions is clipped; each character included in the line is clipped; and then shape characteristics of each character are extracted. Thereafter, the characteristics of the character is compared against a reference pattern of character, which is registered in the second image storage unit 55 in advance, thereby separating character data from the image data. The character data thus separated can be edited by a computer (PC) and converted to widely-recognized text data (character code string).

Next, the second image processing unit 54 determines whether the character data thus separated is color character data or not, in other words whether the character data includes a color attribute or not (Step 7: S7).

In a case in which the thus separated character data includes only black-and-white (two tone) data regarding color thereof (Step 7: S7 NO), the second image processing unit 54 terminates the second image processing and stores the character data temporarily to the first image storage unit 53.

On the contrary, in a case in which the thus separated character data has shadings of multiple tone more than two regarding a specific color, or in a case in which each character in the character string has different color (in a case in which the character string includes different attributes regarding color) (Step S7: S7 YES), the second image processing unit 54 further separates the character data into color data and black-and-white character data (Step 8: S8). The color data and the black-and-white character data derived from the character data are temporarily stored in the first image storage unit 53.

Thereafter, the second image processing unit 54 combines the graphical data thus generated and the color data accompanying the graphical data with the color data accompanying the separated character to generate a file (second data), and stores the file with an auto-generated file name to the second image storage unit 55 provided in the multifunction peripheral 10.

In addition, the second image processing unit 54 makes the black-and-white character data separated from the image data into a file (first data) and stores the file with an auto-generated file name to the external storage device 60 (Step 9: S9).

The file names are, for example, 201008091100a.jpg for the former and 201008091100b.txt for the latter. Here, the second image processing unit 54 attaches information associating the two files each other to each of the two files, in order to record that the two files have been obtained from the same image data.

After finishing storage of the image data, completion of the storage is notified to the input/display unit 50 via the second image processing unit 54. The input/display unit 50 performs display for prompting the user to input presence/absence of a next original to be read. If the user inputs presence of the next original, the steps described above (S1 to S10) are repeated. On the other hand, if the user inputs absence of the next original, the input/display unit 50 instructs the user to detach the external storage device 60. In response to this instruction, the user detaches the external storage device 60 from the multifunction peripheral 10 (Step 11: S11).

Thereafter, the external storage device 60 storing the black-and-white character data, which is a part of the image data, is managed under predetermined conditions.

The storing method of image data obtained from an original has been described. Next, a method according to the present embodiment for reproducing an image from the image data thus stored is described.

Figure 5:
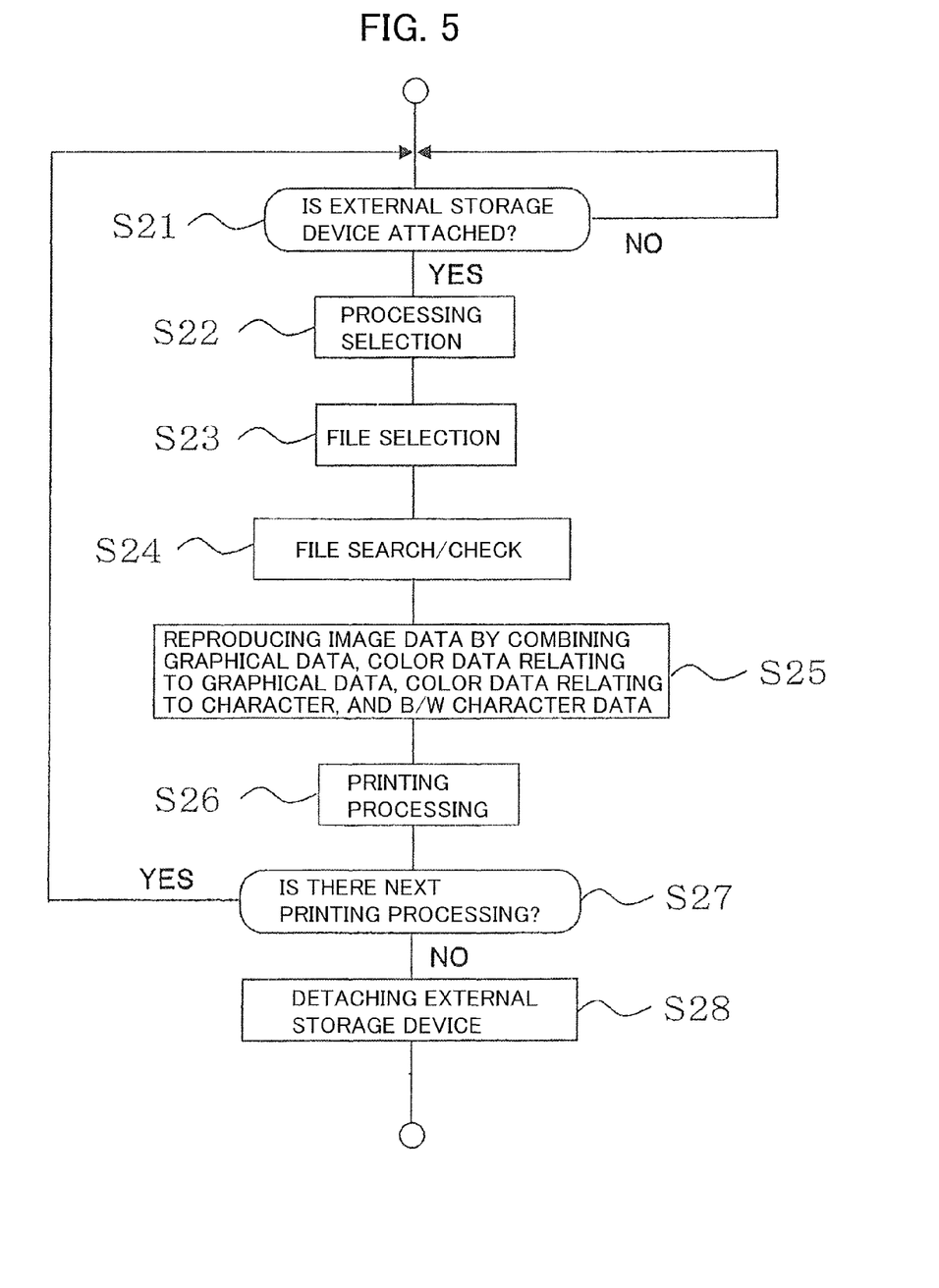
FIG. 5 is a flow chart explaining an image data reproducing method according to an embodiment of the present invention.

FIG. 5 is a flow chart showing a procedure of reproducing the image data stored in the second image storage unit 55 and the external storage device 60 of the multifunction peripheral 10 according to the flow chart in FIG. 4.

First, the attachment monitoring unit 58 of the image forming apparatus (multifunction peripheral 10) monitors continuously whether the external storage device 60 such as a USB flash drive is attached to the main body of the image forming apparatus. If the external storage device is not attached, the image forming apparatus is in the stand-by state (Step 21: S21 NO). When a user attaches the external storage device 60, the attachment monitoring unit 58 detects attachment and transmits a detection signal to the input/display unit 50 (Step 21: S21 YES).

Next, the input/display unit 50, on a touch screen thereof, displays a message "Please Select Process", while displaying in parallel push buttons corresponding to a plurality of processes that can be performed using the external storage device 60 thus attached. Here, a display screen is the same as a processing selection screen displayed upon attachment of the external storage device 60 during the processing shown in the flow chart in FIG. 4, as described above.

When a user selects and presses the push button of "2. reproducing the image of the original by combining data relating to a specific original stored separately in the external storage device 60 and the second image storage unit 55" among the four push buttons displayed on the touch screen, the input/display unit 50 at least displays a list of files stored in the second image storage unit 55 or the external storage device 60 on the touch screen or the like, and prompts the user to select a file (Step 22: S22).

When the user selects a file name of an intended file on the input/display unit 50 (Step 23: S23), the input/display unit 50 outputs an instruction of combination of data relating to the original of the selected file and reproduction of the image to the image forming unit 56.

In response to the instruction, the image forming unit 56 searches for a specific image data file stored in the second image storage unit 55 and the external storage device 60. In addition, the image forming unit 56 checks whether a file of graphical data and color data stored in the second image storage unit 55 and a file of black-and-white character data stored in the external storage device 60 have been obtained from the same original, based on the file names and the information associating two files included in each file (Step 24: S24).

After checking of the files, the image forming unit 56 combines the graphical data, the color data relating to the graphical data, the color data relating to character, and the black-and-white character data stored in the two files to reproduce the image data of the original (Step 25: S25).

Thereafter, the image forming unit 56 drives the image output unit 57.

The image output unit 57 performs printing processing of the original image (image forming processing) (Step 26: S26).

After performing the printing processing (reproduction of the original), the image output unit 57 notifies the input/display unit 50 of completion of the printing processing.

The input/display unit 50 performs display for prompting the user to input presence/absence of a next reproduction of original and printing processing to be performed.

If the user inputs presence of the next printing processing (Step 27: S27 YES), the steps described above (S21 to S26) are repeated. On the other hand, if the user inputs absence of the next printing processing (Step 27: S27 NO), the input/display unit 50 instructs the user to detach the external storage device 60. In response to this instruction, the user detaches the external storage device 60 from the multifunction peripheral 10 (Step 28: S28).

The original is reproduced almost perfectly as described above. In order to simply check the content of the original, the external storage device 60 (such as a USB flash drive) storing the black-and-white character data can be directly connected to the PC 62 shown in FIG. 3 and the content of the original can be easily checked on a display of the PC 62.

As described above, according to the image forming apparatus or the image data storing method of the present embodiment, entire image data is not stored to a single storage medium as in a conventional method, but the graphical data, the color data accompanying the graphical data, the color data accompanying character data are stored to the second image storage unit provided in the image forming apparatus such as a multifunction peripheral and the black-and-white image data is stored in the external storage device that is separated and independent from the image forming apparatus.

As a result, even if a third party has successfully captured the image data stored inside the multifunction peripheral, the data contains only the graphical data and the color data, and does not contain meaningful information composed of character strings. Therefore, it is difficult to read the content of the original only from the data stored in a storage device inside the image forming apparatus (the second image storage unit). This can prevent leakage of substantially meaningful contents of the original from the multifunction peripheral to the outside and complete copying of the original. In the present embodiment, the character data is preferably stored and managed in the external storage device.

In the image data storing method of the present embodiment, the character data in an image data format immediately after reading of an original is converted into text data, which is black-and-white (two tone) character data, and stored to the external storage device. Although the external storage device that can be easily carried and attached/detached with respect to the image forming apparatus such as a multifunction peripheral generally does not provide a large storage volume, the external storage device can store the similar number of files to the second image storage unit provided inside the image forming apparatus and storing the graphical data and the color data high in volume, since a file in a text data format composed only of character data is small in volume. This is also an advantage of the image data storing method of the present embodiment.

As the character data stored in the external storage device is in a black-and-white text data format, character strings in the original that has been reproduced and printed are also represented in text data format. Therefore, in a case in which characters in the original used in image reading are characters obtained by combining figures or pictograms, the reproduced original is different from the original having been read; however, since a highly confidential document to be stored using the image forming apparatus and the method of the present embodiment is generally represented in characters in the text data format, such a highly confidential document is reproduced almost faithfully to the original.

The embodiment described above is for a case of using the image forming apparatus (multifunction peripheral) as a scanner; however, the present invention is not limited thereto and the image data storing method and reproducing method according to the present embodiment can also be employed in copying processing and facsimile transmission processing including an original reading step.

In addition, the image forming apparatus and the storing method and reproducing method of image data of original image according to the present embodiment is mainly for a highly confidential document; however, an original may be aimed at public disclosure and may not require the present embodiment to be employed. In order to support such an original, the image forming apparatus may have: a function of storing a whole set of original image data being read to the second storage unit provided in the image forming apparatus; and a function of allowing selection between a separated storage of the original image data, as in the present embodiment, and a collective storage of the original image data.

Although not described in the above embodiment, the buttons 3 and 4, among the four push buttons displayed on the touch screen during attachment of the external storage device 60 to the image forming apparatus main body, are also for processing an original that has been determined by a user to be not highly confidential.

The present embodiment is useful while being employed in an apparatus that reads a highly confidential original, and generates and stores image data, such as an apparatus having a scanning function, a copy function, a facsimile transmission function, a printing function and the like.

What is claimed is:

1. An image forming apparatus that reads a content of an original as an image and prints the content of the original thus read onto a transfer medium as an image, comprising:
   an internal storage device;
   an attachment portion to which an external storage device can be attached;
   an image reading unit that reads contents of an original as an image and converts the image into an electronic signal;
   a first image processing unit that generates image data from the electronic signal; and
   a second image processing unit that separates the image data thus generated into character data that is recognized as characters and data that is recognized as different data from the character data, and stores data composed of an entirety or a part of the character data that is recognized as characters as first data in the external storage device and the data that is recognized as different data from the character data as second data in the internal storage device when the external storage device is attached to the attachment portion, wherein
   in a case in which color data accompanies the character data, the second image processing unit further separates the character data into black and white character data and the color data accompanying the character data,
   stores data composed of the black and white character data as the first data in the external storage device, and
   stores the data that is recognized as different data from the character data and data composed of the color data accompanying the character data as the second data in the internal storage device.

2. The image forming apparatus according to claim 1, wherein the second image processing unit recognizes graphical data and color data accompanying the graphical data as the different data from the character data.

3. The image forming apparatus according to claim 1 further comprising an image forming unit,
   wherein the image forming unit combines the first data stored in the external storage device and the second data stored in the internal storage device to reproduce the image data of the original, when the external storage device is attached to the attachment portion.

4. The image forming apparatus according to claim 3 further comprising an image output unit,
   wherein the image output unit prints the image of the original onto the transfer medium based on the image data of the original reproduced by the image forming unit.

5. The image forming apparatus according to claim 1, wherein the external storage unit is a USB flash drive.

* * * * *